United States Patent Office 2,881,236

Patented Apr. 7, 1959

2,881,236

THERMOELECTRIC MATERIAL

John C. Evraets, Los Angeles, Calif., assignor to Robertshaw-Fulton Controls Company, Greensburg, Pa., a corporation of Delaware No Drawing. Application June 20, 1957
Serial No. 667,032

6 Claims. (Cl. 136—5)

This invention relates to thermoelectric generators and more particularly to thermocouples or thermopiles for the generation of electrical energy through the utilization of heat.

It is an object of this invention to supply a large amount of power in response to a limited amount of heat.

It is another object of this invention to eliminate the use of nickel as a constituent of a thermoelectric material.

It is a further object of this invention to provide a thermoelectric material with a relatively high melting point.

It is another object of this invention to increase and decrease the thermoelectric power generated linearly with temperature.

It is a still further object of this invention to accomplish the above features with a minimum of expense.

In the preferred embodiment of this invention, a positive thermoelectric element comprising an alloy containing from 6 to 25% molybdenum, from 2 to 10% chromium, and iron is provided to increase the efficiency of thermocouples and thermopiles.

Thermogenerators have particular utility in the gas industry to control the operation of a safety valve. Pilot burners in gas ranges are provided with thermocouples or thermopiles which are responsive to the heat of the pilot burner to generate a current in an electric circuit. The current passes through a coil which is also provided in the circuit and thereby produces a magnetic force which retains the armature of a safety valve. Should the pilot burner accidentally be extinguished, current flow in the circuit will cease and the safety valve armature will be released to stop the supply of fuel. In these devices, a large amount of power is required to retain the safety valve armature while a relatively small amount of heat is available from the pilot burner to produce this power. Therefore, it is imperative that the maximum power of the thermoelements be obtained.

Maximum power production of a thermogenerator is a function of the current generated, electrical resistance, and thermal conductivity of the thermoelectric materials. To obtain maximum power, a maximum current and a minimum electrical resistance and thermal conductivity is desired.

Often a material is found that generates a large voltage but, due to the composition of the metals or alloys employed, the thermocouple components introduce electrical resistance effects which seriously reduce current output, cause excessive heating which extends to the cold junctions, and otherwise impair efficient operation of the thermogenerator.

Alloys of the constantan group, such as copel, give relatively satisfactory results as a negative thermoelectric element and, prior to this invention, type 446 stainless steel and Chromel–P were used as positive thermoelectric elements. The combination of 446 type stainless steel and copel produces only about 85% of the voltage of the combination of Chromel–P and copel and the electrical resistance of Chromel–P is only 8 microhm centimeters greater than that of the 446 type stainless steel. Since the cost of Chromel–P is approximately 8 times the cost of type 446 stainless steel, 446 type stainless steel is employed when little power is desired but the unit becomes rather large when a greater power is desired and, in this case, Chromel–P is generally used.

The high cost of the thermopiles, due to the use of Chromel–P, has led to a search for an inexpensive positive thermoelectric element that has a high melting point, a low electrical resistivity and thermal conductivity and which will generate high power that will vary reasonably linearly with temperature.

This invention makes use of an alloy known commercially as Molite HW 10 which contains approximately 8.25% molybdenum, 4% chromium, 1.9% vanadium, 0.62% carbon and the balance substantially of iron. Superior results as contemplated by this invention are obtained by an alloy containing from 6 to 25% molybdenum, from 2 to 10% chromium and the blance substantially of iron. This alloy will satisfy the above requirements and will cost about the same as 446 type stainless steel. However, when combined with copel, the alloy will generate 88 to 90% of the voltage generated by the Chromel–P and copel combination and the electrical resistance of Molite HW 10 is 20 microhm centimeters less than that of Chromel–P. In addition, Molite HW 10 does not contain nickel. The use of nickel is objectionable because of its catalytic action on gas which causes gas cracking.

Since the voltage generated with the use of Molite HW 10 is nearly the same as that of Chromel–P and the resistance is much less, there will be a larger current output. It is apparent that Molite HW 10 as a thermocouple material will give results superior to the positive thermoelectric elements now employed. It should be understood that the use of the molybdenum, chrome, and iron alloy as a thermoelectric element while described in connection with gas ranges anud the gas industry, is not to be limited thereto but will have application in various other fields.

I claim:

1. A thermocouple comprising a thermoelectric element composed of an alloy consisting of from 6 to 25% molybdenum, from 2 to 10% chromium, and the remainder substantially of iron.

2. A thermopile comprising positive elements composed of an alloy consisting of from 6 to 25% molybdenum and from 2 to 10% chromium and the balance substantially of iron.

3. A thermocouple comprising a positive element composed of an alloy of 8.25% molybdenum, 4% chrome, 1.9% vanadium, 0.62% carbon and the balance essentially of iron.

4. A thermopile comprising positive elements composed of an alloy of 8.25% molybdenum, 4% chrome, 1.9% vanadium, 0.62% carbon and the balance substantially of iron.

5. A thermocouple comprising a negative element and a positive element, said positive element being composed of an alloy of 8.25% molybdenum, 4% chrome, 1.9% vanadium, 0.62% carbon and the balance essentially of iron.

6. A thermocouple comprising a negative element and a positive element, said positive element being composed of an alloy of from 6 to 25% molybdenum, from 2 to 10% chromium, and the remainder substantially of iron.

References Cited in the file of this patent

UNITED STATES PATENTS

| | | |
|---|---|---|
| 1,996,725 | Kingsbury | Apr. 2, 1935 |
| 1,998,953 | Emmons | Apr. 23, 1935 |
| 1,998,957 | Emmons | Apr. 23, 1935 |
| 2,325,759 | Finch | Aug. 3, 1943 |